United States Patent [19]

Atencio

[11] 4,078,388

[45] Mar. 14, 1978

[54] TRANSPORTABLE HYDROMOTIVE ASSEMBLY

[76] Inventor: Francisco Jose Gutierrez Atencio, Entre Rios 3105, Diamante, Argentina

[21] Appl. No.: 703,568

[22] Filed: Jul. 8, 1976

[30] Foreign Application Priority Data

Jul. 14, 1975 Argentina .............................. 259565

[51] Int. Cl.² .............................................. E02B 9/00
[52] U.S. Cl. .......................................... 61/19; 61/87; 290/53; 417/234
[58] Field of Search ................... 61/19, 20, 69, 63, 30, 61/86, 43, 87; 415/145; 417/234; 290/53, 42; 416/85

[56] References Cited

U.S. PATENT DOCUMENTS 2,764,871   10/1956   Dowling ................................. 61/19

3,415,068   12/1968   Casey, Jr. et al. .................. 61/69 R

FOREIGN PATENT DOCUMENTS 1,123,466   6/1956   France ................................. 417/234
122,662   10/1927   Switzerland ............................. 61/20

*Primary Examiner*—Jacob Shapiro
*Attorney, Agent, or Firm*—Emory L. Groff, Jr.

[57] ABSTRACT

A submersible hydromotive assembly is provided for an energy storing dam and includes chambers defined in its structural body which can be filled with water to sink the assembly or with gas to float it. Additionally, the hydromotive assembly has a machine hall with auxiliary equipment required to start, maintain in running condition and stop a turbine-generation set. Also included is the method of submerging and positioning the submersible hydromotive assembly at the water passage flow path of a dam.

16 Claims, 4 Drawing Figures

TRANSPORTABLE HYDROMOTIVE ASSEMBLY

BACKGROUND OF THE INVENTION

The present invention relates to hydromotive assemblies for hydroelectric plants or pumped storage plants and more particularly to a submersible hydroelectric assembly and to an energy storing dam adapted to receive it.

Hydromotive assemblies for hydroelectric production plants and pumped storage plants are, obviously, well known in the art.

The aim of such hydromotive assemblies, positioned at the inlet or outlet of the water passages engineered through hydraulic structures such as dams, is to convert the inherent gravitational energy of the water stored in the reservoir behind the dam into electric energy. The efficiency of this conversion is particularly important in low-head hydroelectric plants.

It is known that in a hydroelectric station the highest efficiency is attained when the hydraulic passages which directs the water flow through the dam are shaped like rectilinear embodiments. If these passages have bands, scrolls, elbow draft diffusers; the efficiency of the energy conversion is reduced because of increased friction between the water flowing through them and the inner surfaces thereof, thus reducing the amount of energy output of the hydroelectric station.

Furthermore, the erection costs of these civil engineered structures with such complicated water passages is highly expensive and puts a great financial overburden on the respective enterprises. There are also, great constructive delay involvements on these engineered projects before putting them in the commissioned operative status.

It is also known, that the best hydroelectric station engineered project must be designed under standardized concepts and mass produced industrial components. Furthermore, under operational performance, the concerned hydroelectric station must not have shutdown delays for cause of maintenance procedures on generators and turbines.

It must have also, a low investment cost figure in terms of money invested per kW. of installed capacity.

Additionally, the erection time schedule required to install turbines and generators and put them in operation must be the shortest possible one. All these objectives are claimed to be made possible by means of the present invention.

All these considerations which not only take into account hydraulic efficiency but also financial requirements, have not been fulfilled because the technology in low-head hydroelectric generation has not been advanced enough in efficient terms in recent years, to keep pace with the most spectacular and massive nuclear electric generation developments.

Consequently, less efficient design concepts and erection methods are used today although they are very expensive and produce very large engineered structures, requiring great delays in commissioning them.

It is an aim of the present invention to enable the provision of optimum erection methods by providing means for manipulating, positioning and mounting hydroelectric equipments with relative ease and in a very short time, in spite of the cumbersome sizes and heavy weights.

An additional aim of the present invention has been to provide a novel engineering approach in design technology whereby it is possible to increase the erection speed of a known hydroelectric project, thus minimizing the time delays to be supported until the commissioning date.

Because of their inherent modernizing trend and cost reducing concepts with mass produced interchangeable components to be introduced in hydroelectric plant construction designs, horizontal axis capsule-mounted generators with propeller fixed blade turbines or reversible Kaplan turbines acting as motive machines, which today are limited to very low-head hydroelectric projects; will be progressively installed in higher heads and fully involved in this novel technique, thus flexibilizing actual engineering trends in hydroelectric station designs and providing a better and more efficient tool for massive electric power interchanges purposes.

This statement is also applied to the tubular turbine with a peripheral rim mounted generator, first invented by the American Engineer Leroy F. Harza some 50 years ago.

An even further aim of the present invention has been to provide a novel engineered arrangement whereby hydraulic structures already built for other purposes such as: flood control dams, navigation development systems, irrigation intakes, abandoned dikes etc., can be easily converted into hydropower generating plants.

A further aim of the present invention has been to provide a new technique designed to modernize actual hydroelectric station operational procedures by means of the provision of reversible motor-generator equipment designed to be positioned against sluices and flow outlet structures.

By means of this arrangement, the electric power pattern belonging to the electric output of these hydrostations, is flexibilized following a combind output-input electric power interchangeable modified methodology.

This technical fact, permits modernization of obsolete hydrostations, at a very reduced cost.

According to one aspect of the present invention there is provided a substantially hydromotive assembly for an energy transformation purpose to be fitted against the structural body of a dam, in coincidence with the gated water passages embodied in the dam structure. In the general arrangement, the submersible hydromotive assembly is positioned upstream of the dam. It has incorporated a water conduit in the structural body, defined by a lateral wall surrounding the hydromotive machine and having a first open end for water admission and a second open end for discharging water entering the first open end. Auxiliary means are available for purposes of water flow control and water flow regulation as it is well known in the art.

This submersible hydromotive assembly is provided with, at least, one chamber defined in said lateral wall and of a volume at least sufficient to cause sinking or floatation of said hydromotive assembly when the former is filled with liquid or gas, respectively. Means are also provided for filling the chamber with liquid for sinking purposes or with gas for floatation purposes.

Another method for providing sinking or floatation of the hydromotive assembly is by means of incorporable or removable ballast weights positioned around the structural body of said hydromotive assembly.

This structural body incorporates also, a machine hall which includes the required equipment for the proper operational performance of said hydromotive assembly, such as: turbine governors, generator controls, compressed air systems, lubrication circuits and treatment systems, water refrigeration and treatment systems, emergency energy sources, self propulsion for autonavigation, man-living facilities; and so on.

According to an even further aim of the present invention a new concept in engineering design of hydroelectric plants which flatly avoids the machine hall and related powerhouse structures incorporated at the dam, is provided. This novelty in engineering design produces a highly standardized criteria for dam designs and dam construction procedures, mainly because the simplification provided by the suppression of the expensive and difficult to build machine hall.

Maintenance of motive machines is simplified too. Machines which require important overhauls are instantly shifted away and replaced by operative-ones arriving from the servicenter. In this way, a unique service station is provided for the maintenance of a plurality of hydroelectric stations, thus revolutionizing maintenance concepts.

According to an even further aspect of the present invention, a method is provided for submerging and positioning a hydromotive assembly against a dam having means for producing control of water discharges through it, and having means for positioning and securing said submersible hydromotive assembly, upstream or downstream of said dam.

The method comprising the steps of: a). Taking a hydromotive assembly having a structural body, a water inlet and a water outlet and at least one chamber defined in said structural body; b). Floating the hydromotive assembly slighty upstream of said dam and so oriented that the longitudinal axis of said body and which extends through said water inlet and outlet, is parallel to the axis of said water directing means of the dam and positioned substantially thereabove; c). Introducing a liquid into said chamber to cause sinking of said submersible hydromotive assembly; d). Directing the sinking hydromotive assembly until it slighty rests on the bottom slab. e). Displacing the hydromotive assembly along the supporting slab to position its water outlet against the inlet of the water directing means engineered through the body of the dam. This sequence is produced by means of cables trained by cranes, winches, or by jacking arrangements, or other devices well known in the art. f). Securing the hydromotive assembly in such working position.

Although references in the specification are applied to rectilinear turbine-generator arrangements, it will be obvious to those skilled in the art that the teachings of the present invention are independent of the specific linear arrangement of both machines, and that such teachings are also applicables to hydromotive assembly arrangements in which such geometric spatial configuration follows any desired pattern.

DESCRIPTION OF THE PREFERRED EMBODIMENT

Figure 1:
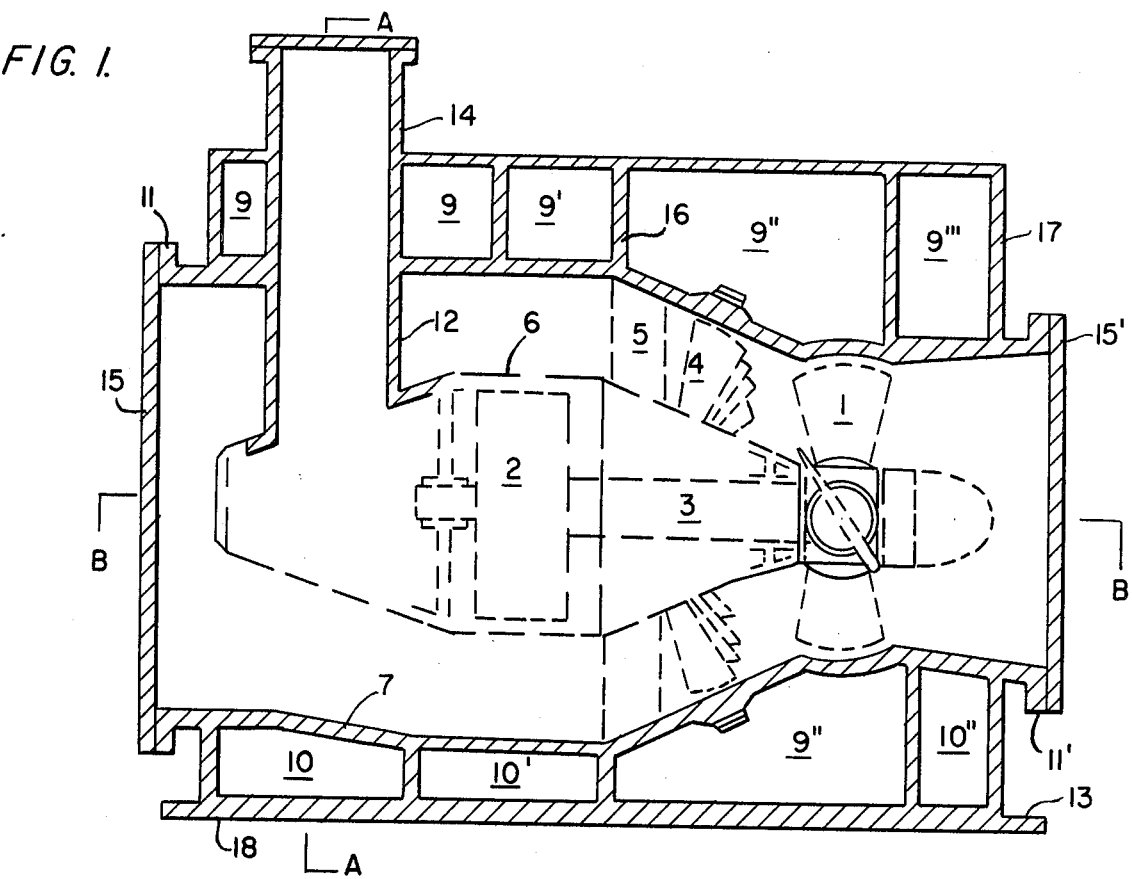
FIG. 1 represents a schematic longitudinal vertical cross section through a hydromotive submersible assembly incorporating the turbine capsule-mounted generator hydroelectric arrangement and related novelties.

In FIG. 1 there is schematically represented a hydromotive submersible assembly comprising the power generation means compounded by the hydraulic turbine 1 and the electric generator 2 enclosed inside the capsule 6, and joined by the horizontal connecting axis or axle 3. Means are provided for providing control of the water actuating flow by means of the fixed distribuitor 5 and the moving distribuitor 4. Actuating water flow is conveyed through the hydraulic turbine following the annular path limited by the walls of the generator capsule 6 and of the water directing conduit 7. Surrounding the wall of said water conduit 7, we find a plurality of chambers 8, 8', 8" . . . , 9, 9', 9" . . . , 10, 10', 10" . . . , which surround the periphery of the water passage defined by said structural wall 7. These chambers 8, 8', 8" . . . etc. to: 10, 10', 10" . . . etc., are positioned one beside another and extend substantially from an intake flange end 11 to an outlet flange end 11' as well as annularly around structural wall 7. The lateral chambers 8, 8', 8", . . . etc. are preferably intended to be filled with liquid to cause sinking of said hydromotive assembly or with gas to cause floatation thereof. The upper chambers 9, 9', 9", . . . instead, are preferably service chambers and house auxiliary equipments such as: governors, compressed air machines, water refrigeration systems, generator controls, emergency electric power generation, and so on. Bottom chambers 10, 10', 10" . . . are mainly for internal ballasting purposes, for stabilizing floatation of the transportable assembly when in navigation.

It has been found that although a single chamber replacing chambers 8, 8', 8", . . . is adequate for the purposes of the present invention, it is preferable to provide a plurality of individual chambers as shown in the drawings.

These chambers are individually connected to a main duct which provides the required amount of pressurized gas or compressed air to produce the displacement of the liquid enclosed therein for floatation purposes. Similarly one inlet for liquid admission for each chamber, and one outlet for liquid exhaustion for each chamber are also provided.

The gross volume of the chambers defined in the periphery of the structural wall 7 and adapted to be filled with liquid is at least sufficient to cause sinking of the hydromotive transportable assembly when they are filled with liquid.

Likewise, this gross volume is at least sufficient to cause floatation of said hydromotive transportable assembly when they are filled with gas or with air for transportation purposes.

Both, sinking and floatation sequences are made in any desired controlled position of said hydromotive assembly.

Figure 2:
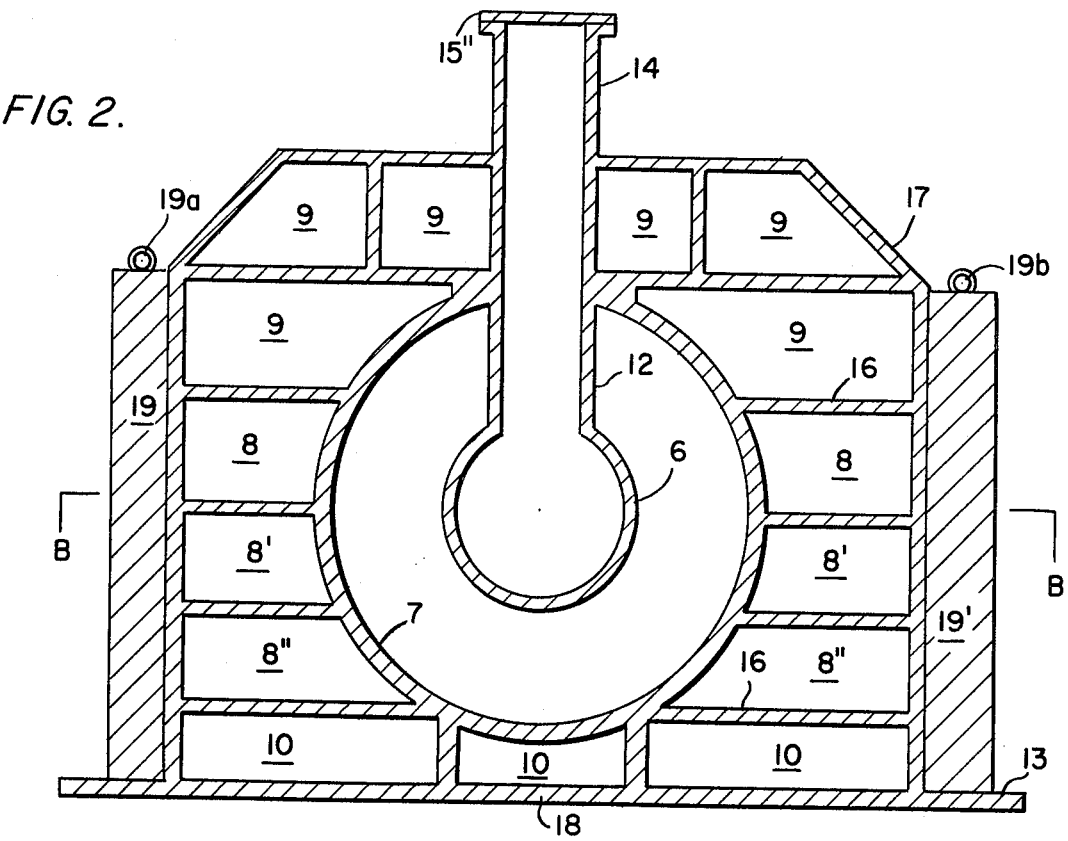
FIG. 2 is a vertical transversal cross section taken along axis A—A as seen in the direction of the corresponding arrows shown in FIG. 1 and in FIG. 3.
Figure 3:
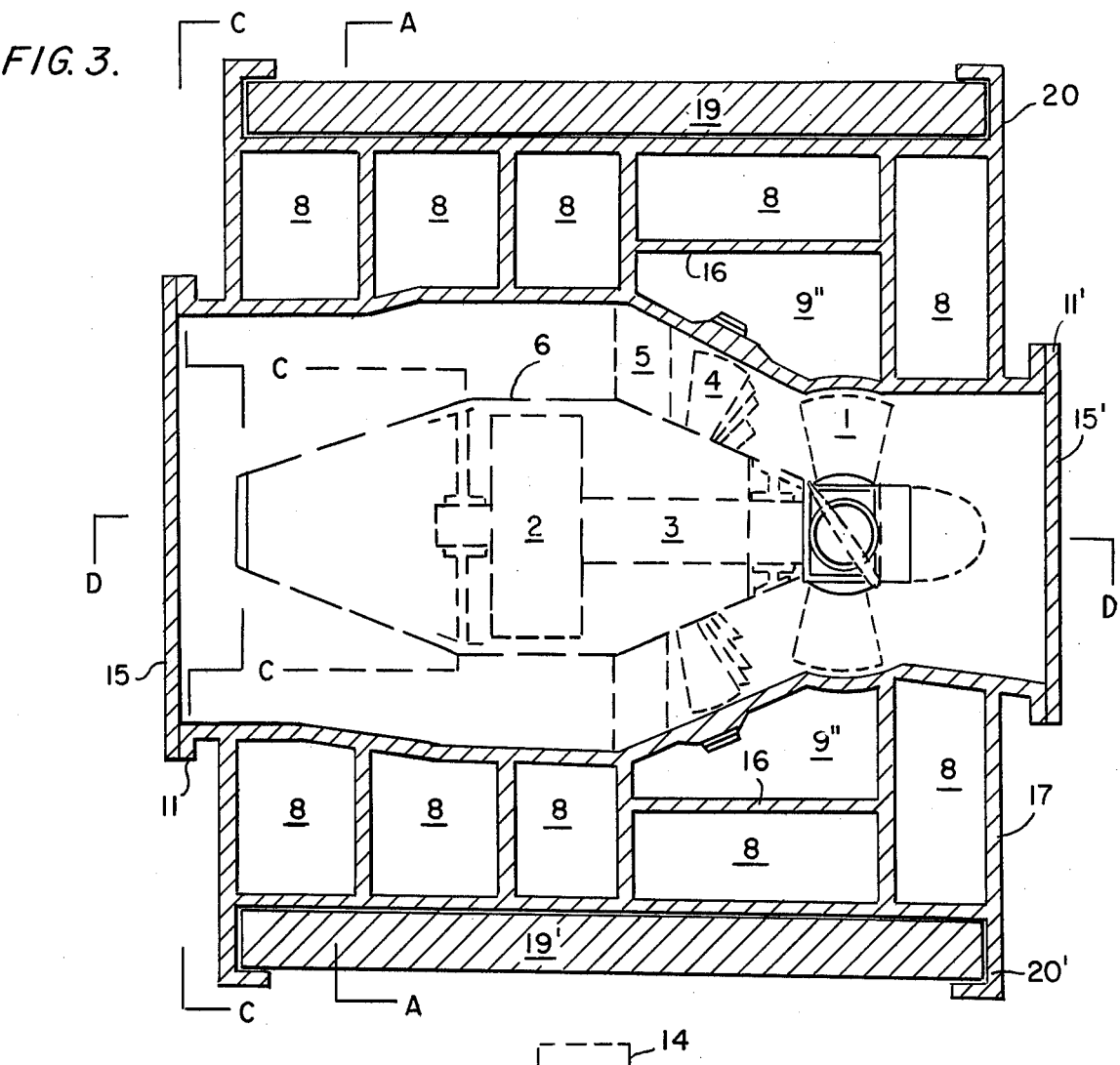
FIG. 3 is a horizontal longitudinal cross section taken along axis B—B as seen in the direction of the corresponding arrows shown in FIG. 2, FIG. 1 and FIG. 4.

Another method to provide sinking of the hydromotive assembly is by means of incorporable external ballast weights 19, 19'; moved by cranes by means of collars 19a, 19'b; and lodged within recesses 20, 20', embodied on structural external wall 17, as seen in FIGS. 3 and 2.

Referring again to FIG. 1, the structural wall 7 defining the hydraulic conduit is provided with flanged structures 11' surrounding the intake and the outlet of said hydraulic conduit. Removable closing covers 15' could be fitted against these flanges. In this way, an auxiliary waterproof chamber is provided for purposes of floatation of the assembly when gas is admitted into the enclosed chamber defined around capsule 6 wall, and inner wall 7 of water conduit.

This arrangement, provides an alternate means for floatation purposes of said hydromotive assembly, so replacing duty performed by chambers 8; or, alternatively, serves for purposes of easing the navigation requirements of said hydromotive assembly when in transportation, because of the reduced draft of the vessel; thus complementing the duty performed by the chambers 8.

The body of the hydromotive submersible assembly comprises an external wall 17 and a supporting base 18 which rests on a concrete slab, thus transmitting the weight of said submerged hydromotive assembly to the rocky bottom or to the arranged engineered structure. Once the assembly is positioned and rests on the base 18, it is secured against the concrete slab by means of bolts (not shown) passing through flanges 13.

Figure 4:
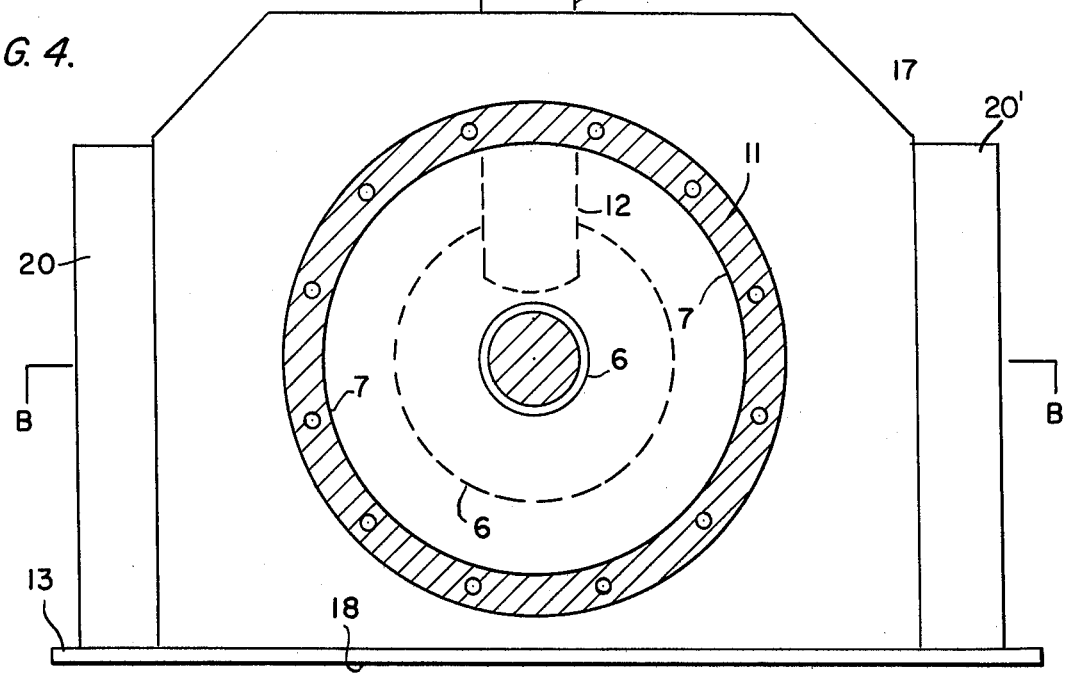
FIG. 4 is a vertical schematic cross section through the water inlet of the hydromotive assembly, as seen in the direction of the arrows shown in FIG. 3.

Access means 12 and 14 are provided to enable an operator to approach the hydroelectric machines for serving purposes and inspection maintenance procedures, as seen in FIG. 1, FIG. 2 and FIG. 4 and may be provided with a closing cover 15".

According to the present invention it is possible to adapt conventional hydraulic structures such as dams; to receive the Transportable and Submersible Hydromotive Assembly concept as energy producing mean; or energy transformation means, simply by the addition of wall extensions to the abutments of those dams with gated passages engineered through the bodies of these abutments to complement the structure of the present invention.

These gated water passages could be also, engineered through the main structural bodies of those dams.

It will be understood that improvements may be introduced in the embodiment described, without departing from the scope of the invention defined in the following claims.

I claim:

1. A method of submerging and positioning a hydromotive assembly in a dam having means for directing water through it and supporting means extending upstream or downstream of said water directing means, the method comprising the steps of: a) Taking a hydromotive assembly comprising a water flow circulation path defined by a conduit having a lateral wall for directing water through an incorporated energy transformation unit for causing actuation thereof or receiving actuation thereto, and having a first open and a second open end for discharging water entering the first open end; at least one chamber defined in said lateral wall or ballast means incorporables to it; b) Floating the hydromotive assembly slighty upstream or downstream of said dam and oriented so that the longitudinal axis of said hydromotive assembly and which extends through said ends, is parallel to the axis of said dam water directing means and positioned substantially thereabove; c) Introducing fluid into said chamber to cause sinking of said hydromotive assembly or; alternatively, incorporating ballasts to it; d) Directing the sinking hydromotive assembly so that his base rests on said supporting means; e) Drawing the hydroelectric assembly along the supporting means to position his open end against the inlet or the outlet of said dam water directing means; f) Securing the transportable hydromotive assembly in such position.

2. A submersible hydromotive assembly for an energy storing dam having means for directing water through it; said hydromotive assembly comprising a water flow circulation path defined by a conduit having a peripheral wall for directing water therethrough; an energy transformation unit designed for causing an electrical input or output thereto to achieve a power balance; said conduit having a first open end and a second open end for discharging the water entering said first open end, at least one of said open ends adapted to be positioned against at least one end of said dam water directing means; means for controllably influencing said electric power balance output-input of said energy transformation unit and at least one chamber defined in said conduit peripheral wall and of a volume at least sufficient to cause sinking or flotation of said hydromotive assembly when said chamber is filled with liquid or with gas, respectively.

3. Submersible hydromotive assembly as claimed in claim 2, in which said energy transformation unit is mainly designed to perform as an energy generation unit during actuation thereof.

4. Submersible hydromotive assembly as claimed in claim 2, further comprising means for filling said chamber with liquid for sinking purposes or with gas for floatation purposes.

5. Submersible hydromotive assembly as claimed in claim 2, further comprising a plurality of said chambers arranged to cause sinking or floatation of said hydromotive assembly in any desired controlled position when the said chambers are filled with liquid or gas, respectively.

6. A submersible hydromotive assembly as claimed in claim 2 including, a capsule within said conduit, and said transformation unit comprising a motor/generator having a substantially horizontal axis mounted within said capsule and joined to a propeller-actuated turbine.

7. A submersible hydromotive assembly as claimed in claim 6 wherein, said chamber is disposed between said conduit wall and said capsule.

8. Submersible hydromotive assembly for an energy storing dam having means for directing water through it; the hydromotive assembly comprising a water flow circulation path defined by a conduit having a peripheral wall for directing water therethrough, an energy transformation unit designed for causing an electrical input or output thereto to achieve a power balance; said conduit having a first open end and a second open end for discharging the water entering said first open end, at least one of said open ends adapted to be positioned against at least one end of said dam water directing means; means for controllably influencing said electric power balance output-input of said energy transformation unit; at least one chamber defined by said peripheral wall and of a volume at least sufficient to cause sinking or flotation of said hydromotive assembly when said chamber is filled with fluid or with gas, respectively; and two removable closing covers fitted at flanges both positioned around said first and second ends.

9. Submersible hydromotive assembly as claimed in claim 8, further comprising means for filling said chamber with liquid for sinking purposes or with gas for floatation purposes.

10. Submersible hydromotive assembly as claimed in claim 8, further comprising a plurality of said chambers arranged to cause sinking or floatation of said hydromotive assembly in any desired controlled position when the said chambers are filled with liquid or gas, respectively.

11. Submersible hydromotive assembly as claimed in claim 8, in which said energy transformation unit is mainly designed to perform as an energy generation unit during actuation thereof.

12. A submersible hydromotive assembly for an energy storing dam having means for directing water through it; said hydromotive assembly comprising a water flow circulation path defined by a conduit having a peripheral wall for directing water therethrough; an energy transformation unit designed for causing an electrical input or output thereto to achieve a power balance; said conduit having a first open end and a second open end for discharging the water entering said first open end, at least one of said open ends adapted to be positioned against at least one end of said dam water directing means; means for controllably influencing said electric power balance output-input of said energy transformation unit and means defined in said peripheral wall adapted to receive solid ballast means of a weight at least sufficient to cause sinking or flotation of said hydromotive assembly when said ballast is fitted or removed, respectively.

13. Submersible hydromotive assembly as claimed in claim 12, further including a plurality of chambers arranged to cause sinking or floatation of said hydromotive assembly in any desired controlled position when the former are filled with fluid or gas, respectively.

14. Submersible hydromotive assembly as claimed in claim 12, in which said energy transformation unit is mainly designed to perfome as an energy generation unit during actuation thereof.

15. A submersible hydromotive assembly as claimed in claim 12 including, a capsule within said conduit, and said transformation unit comprising a motor/generator having a substantially horizontal axis mounted within said capsule and joined to a propeller-actuated turbine.

16. A submersible hydromotive assembly as claimed in claim 15 wherein, said ballast receiving means includes recesses in said peripheral wall.

* * * * *

UNITED STATES PATENT OFFICE
CERTIFICATE OF CORRECTION

PATENT NO. : 4,078,388
DATED : March 14, 1978
INVENTOR(S) : FRANCISCO JOSE GUTIERREZ ATENCIO It is certified that error appears in the above-identified patent and that said Letters Patent are hereby corrected as shown below:

Column 1, line 24, change "bands" to -- bends --.
Column 2, line 35, change "combind" to -- combined --.
Column 2, line 41, change "substantially" to -- submersible --.
Column 4, line 64, change "19'b" to -- 19b --.
Column 5, line 1, after "structures" insert -- 11 --.
Column 5, line 2, after "covers" insert -- 15 --.
Column 5, line 26, change "serving" to -- servicing --.

Claim 14, line 3, change "perfome" to -- perform --.

Signed and Sealed this

Thirteenth Day of February 1979

[SEAL]

Attest:

RUTH C. MASON
Attesting Officer

DONALD W. BANNER
Commissioner of Patents and Trademarks